United States Patent

[11] 3,611,162

[72] Inventor Yutaka Tochitani, Tokyo, Japan
[21] Appl. No. 53,525
[22] Filed July 9, 1970
[45] Patented Oct. 5, 1971
[73] Assignee Yokogawa Electric Works, Ltd., Tokyo, Japan

[54] APPARATUS FOR DETECTING ABNORMAL CONDITIONS OF AC SOURCES
3 Claims, 2 Drawing Figs.

[52] U.S. Cl. ............................................. 328/150, 317/31, 307/235, 307/273, 307/290, 307/296
[51] Int. Cl. ............................................. H03k 5/20
[50] Field of Search ........................... 307/235, 290, 273, 296, 297, 289; 328/120, 150; 317/31; 178/69 G; 340/167, 168, 169

[56] References Cited
UNITED STATES PATENTS
3,125,691 3/1964 Astheimer ............... 307/273
3,327,230 6/1967 Konian .................... 328/150

Primary Examiner—Donald D. Forrer
Assistant Examiner—David M. Carter
Attorney—Chittick, Pfund, Birch, Samuels & Gauthier ABSTRACT: Apparatus for detecting abnormal conditions of an AC source comprises first and second Schmitt trigger circuits respectively responsive to first and second levels of the rectified voltage of the source voltage, a first monostable circuit responsive to the end of the output pulse from the second Schmitt trigger circuit for producing a pulse of a constant width which is longer than the spacing between output pulses from the second Schmitt trigger circuit at the normal frequency of the source, a bistable circuit which is set at the beginning of the output pulse from the first Schmitt trigger circuit and reset at the end of the output pulse from the first monostable circuit, a second monostable circuit responsive to the beginning of the output pulse from the second Schmitt trigger circuit for producing a pulse of a constant width which is longer than the spacing between output pulses from the bistable circuit at the normal frequency of the source and a gate circuit responsive to the output pulses from the bistable circuit and the second monostable circuit for producing an abnormal signal in the absence of these two output pulses.

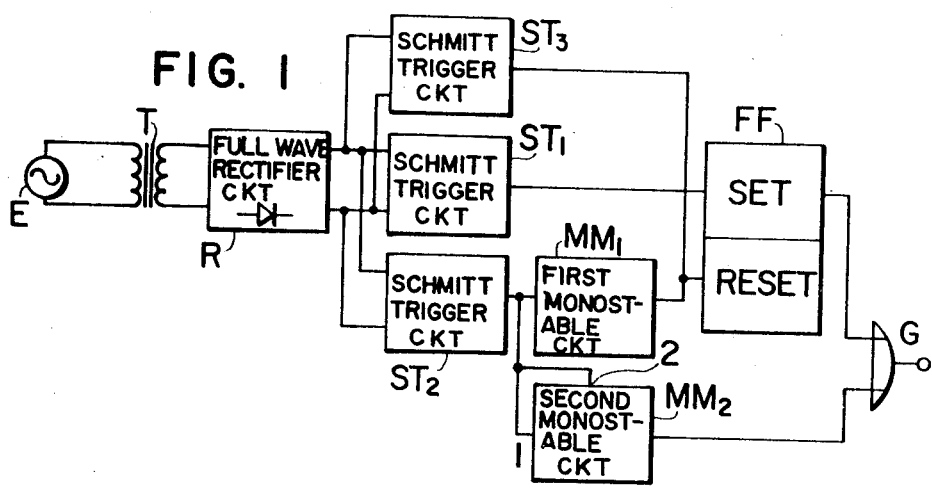
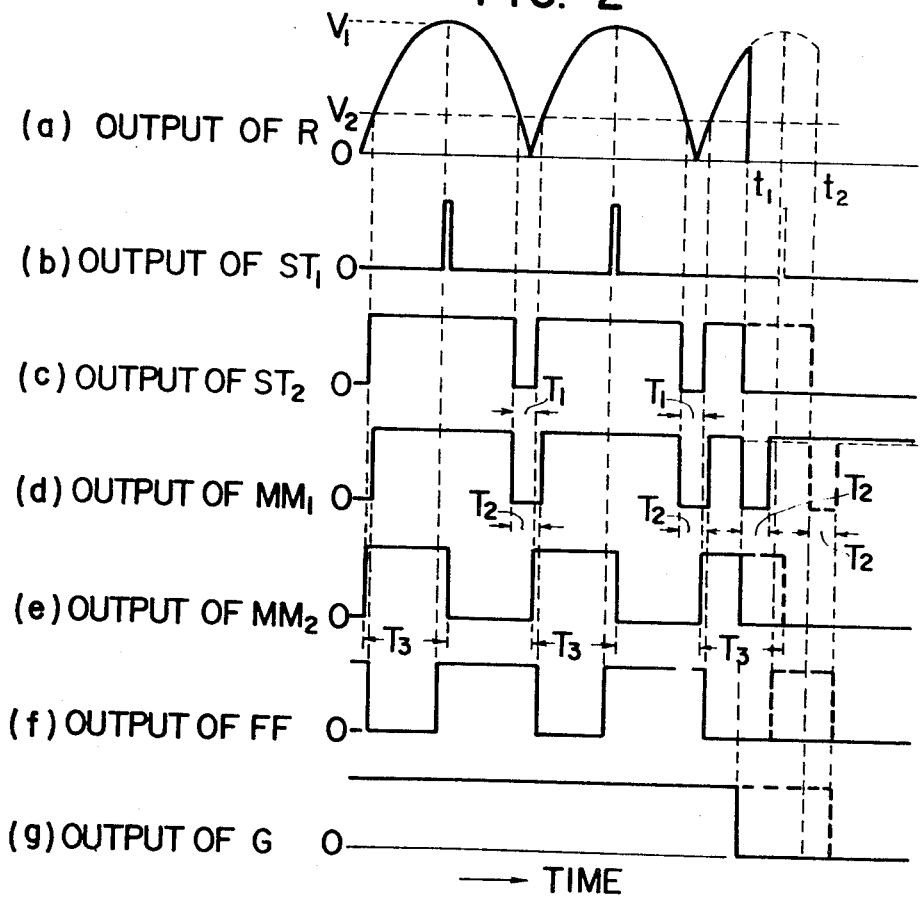

APPARATUS FOR DETECTING ABNORMAL CONDITIONS OF AC SOURCES

BACKGROUND OF THE INVENTION

This invention relates to apparatus for detecting abnormal conditions of an AC source such as an interruption of the service, abnormal voltages, decrease of the frequency and the like.

When an abnormal condition of a source of supply such as an interruption of the service occurs during the operation of a digital computer energized by the AC source, the contents of memories of the computer are lost and can not assure their normal operation thus resulting in serious troubles. For this reason, when an abnormal condition occurs it is necessary to detect it as fast as possible so as to protect the contents of memories and to switch the source to an auxiliary source. Prior art apparatus require several cycles (in terms of the source frequency) to detect the fault after it has occurred but such a low-speed response is not satisfactory to modern high-speed electronic computers.

SUMMARY OF THE INVENTION

It is therefore an object of this invention to provide a new and improved abnormal-condition-detecting apparatus capable of detecting abnormal conditions of an AC source at an extremely high speed for example within one-tenth cycle.

According to this invention there is provided apparatus for detecting an abnormal condition of an AC source comprising a rectifier to rectify the voltage of the AC source, a first Schmitt trigger circuit to produce a pulse at a first level of the rectified voltage, a second Schmitt trigger circuit to produce a pulse at a second level of the rectified voltage which is lower than the first level, a first monostable circuit responsive to the end of the output pulse from the second Schmitt trigger circuit for producing a pulse of a constant width which is longer than the spacing between output pulses from the second Schmitt trigger circuit when the frequency of the source voltage is normal, a bistable circuit which is set at the beginning of the output pulse from the first Schmitt trigger circuit and reset at the end of the output pulse from the first monostable circuit, a second monostable circuit responsive to the beginning of the output pulse from the second Schmitt trigger circuit for producing a pulse of a constant width which is longer than the spacing between output pulses from the bistable circuit when the frequency of the source is normal, and a gate circuit responsive to the output pulse from the bistable circuit and the output pulse from the second monostable circuit for producing an abnormal signal in the absence of these two output pulses supplied to the gate circuit.

BRIEF DESCRIPTION OF THE DRAWING

In the accompanying drawing:

FIG. 1 shows a block diagram of one embodiment of this invention and

FIG. 2 shows various waveforms to explain the operation of the embodiment shown in FIG. 1.

DESCRIPTION OF THE PREFERRED EMBODIMENT

Referring now to FIG. 1 there is shown an AC source E of a commercial frequency which feeds a load such as an electronic computer, not shown. The voltage of the source is applied to a full-wave rectifier circuit R via a transformer T and the rectified DC output of the rectifier circuit is applied to the inputs of a first Schmitt trigger circuit $ST_1$ and a second Schmitt trigger circuit $ST_2$. The output from the first Schmitt trigger circuit is applied to a bistable circuit FF as a set input while the output from bistable circuit FF is applied to an OR gate circuit G as one input signal. The output from the second Schmitt trigger circuit $ST_2$ is coupled to a first monostable circuit $MM_1$, the output thereof being utilized to reset bistable circuit FF. The output from the second Schmitt trigger circuit $ST_2$ is also applied to input terminals 1 and 2 of a second monostable circuit $MM_2$ while the output thereof is applied to another input terminal of OR gate G so as to produce a signal representing an abnormal condition at the output terminal of the OR gate G. The second monostable circuit $MM_2$ operates such that it produces a zero output when the output from the second Schmitt trigger circuit $ST_2$ becomes zero. Various circuits described above are energized by a DC source not shown, having a certain time constant.

The operation of the apparatus will now be considered with reference to FIG. 2 which shows waveforms of the outputs of various elements shown in FIG. 1. As shown in FIG. 2a, a full-wave rectified-voltage is supplied to first and second Schmitt trigger circuits $ST_1$ and $ST_2$ from the rectifier circuit R. In response to this input the first Schmitt trigger circuit $ST_1$ produces a pulse at a level $V_1$ of the input voltage as shown in FIG. 2b to set the bistable circuit FF at the beginning of the pulse whereas the second Schmitt trigger circuit $ST_2$ produces a pulse at a level $V_2$ of the input voltage as shown by FIG. 2c. The interval or spacing between the end of each pulse and the beginning of the next pulse is represented by $T_1$. Responsive to the voltage change at the end of each pulse shown in FIG. 2c, the first monostable circuit $MM_1$ produces a pulse having a width $T_2$ of zero voltage, as shown in FIG. 2d so as to reset bistable circuit FF at the end of each pulse. As above described since the bistable circuit FF is set by the pulse shown in FIG. 2b, the bistable circuit FF produces a pulse as shown in FIG. 2f which is applied to one input of OR gate circuit G. The circuits are constructed such that as long as the frequency of the source voltage is normal the width $T_2$ of zero voltage of the output pulse of the first monostable circuit $MM_1$ shown by FIG. 2d is larger than the width $T_1$ of zero voltage or interval of the output pulses of the second Schmitt trigger circuit $ST_2$ shown in FIG. 2c. Since the output from the second Schmitt trigger circuit $ST_2$ is also applied to the second monostable circuit $MM_2$, this circuit $MM_2$ produces a pulse having a width $T_3$ as shown in FIG. 2e which is applied to the OR gate circuit as the other input signal. The width $T_3$ of the output pulse from the second monostable circuit $MM_2$ is selected such that so long as the source frequency is normal both ends of the output pulse overlap the terminal end and the beginning end of two adjacent output pulses from bistable circuit FF as shown in FIGS. 2e and 2f. As shown in FIG. 2g, the output from OR gate G has a constant level where it receives either one or both of the pulses shown by FIGS. 2e and 2f.

Assuming now that an interruption of the service of the source occurs at an instant $t_1$ the output from the second Schmitt trigger circuit $ST_2$ will become to zero so that the output from the second monostable circuit $MM_2$ will also become zero. At this time since bistable circuit FF has already been reset to reduce its output zero, two inputs to the OR gate G become to zero to reduce its output to zero thus providing a signal representing the interruption of the service.

When the interruption of the service occurs at an instant $t_2$ past the maximum source voltage the output from the second Schmitt trigger circuit $ST_2$ becomes zero at this time the output from the second monostable circuit $MM_2$ is already zero. In this case, however, since bistable circuit FF has already been set by the output from the first Schmitt trigger circuit $ST_1$ to produce an output OR gate G will not produce an abnormal signal. On the other hand, when the output from the second Schmitt trigger circuit $ST_2$ becomes zero the first monostable circuit $MM_1$ will produce a pulse having an interval $T_2$ in response to the terminal end of the output pulse from the second Schmitt trigger circuit $ST_2$. At the end of the output pulse from the first monostable circuit $MM_1$ the bistable circuit FF is reset to reduce its output to zero. Since OR gate G produces no output when both inputs are zero, the output from OR gate is reduced to zero thus producing a signal representing the interruption of the service. In this manner, where an interruption of the service occurs past the maximum source voltage it is detected at an instant later than the occurrence of the fault by an interval $T_2$, which is selected to be equal to about one-tenth of one cycle of the source voltage. As this interval is sufficiently smaller than the time constant of the DC source energizing various circuit elements, such circuit elements can operate steadily during this interval.

When the source voltage decreases to a value lower than $V_1$ the first Schmitt trigger circuit $ST_1$ will not produce an output pulse so that the bistable circuit FF will not be set so that the output signal applied to OR gate G will remain at zero. Thus as soon as the output pulse from the second monostable circuit $MM_2$ becomes zero, the output from the OR gate G is also reduced to zero to provide an abnormal signal. It is possible to adjust the permissible lower limit of the source voltage by adjusting the trigger level $V_1$ of the first Schmitt trigger circuit $ST_1$. Where a third Schmitt trigger circuit $ST_3$ having a higher trigger level than the trigger level $V_1$ of the first Schmitt trigger circuit $ST_1$ is added to reset the bistable circuit FF by the output pulse from the third Schmitt trigger circuit $ST_3$, it becomes possible to produce an abnormal signal when the source voltage increases abnormally, thus setting a permissible upper limit of the source voltage.

Upon decrease in the frequency of the source voltage the zero voltage interval $T_1$ of the output pulse from the second Schmitt trigger circuit $ST_2$ increases to a value larger than the zero voltage interval $T_2$ (which is constant) of the output pulse from the first monostable circuit $MM_1$ so that both input voltages to the OR gate G become zero at the same time. Under such conditions, the output from the OR gate G becomes zero thus producing an abnormal signal. At this time the spacing between output pulses from the first Schmitt trigger circuit $ST_1$ increases to delay the time at which the bistable circuit FF is set later than the end of the output pulse from the second monostable circuit $MM_2$ to decrease to zero both input signals to OR gate G thus detecting the decrease in the frequency of the source voltage. The permissible lower limit of the frequency may be adjusted by the operation of the first and second monostable circuits $MM_1$ and $MM_2$.

While in the foregoing example the abnormal condition is detected by the full-wave rectification of the source voltage, where a detecting time of about a one-half cycle is permissible, half-wave rectifier may be used.

Further, it is to be understood that the gate circuit for producing an abnormal signal is not limited to the illustrated OR gate circuit but it is possible to use any type of gate circuit which can produce the abnormal signal in the absence of two input signals, and that output pulses from respective circuits may have polarities different from those shown in FIG. 2.

Thus, the invention provides novel apparatus which can detect at an extremely high speed abnormal conditions of an AC source such as an interruption of the service, an abnormal voltage or a decrease in the frequency, so that the apparatus is especially suitable for use in a digital computer to protect contents of memories or to switch the source to an auxiliary source in response to abnormal conditions of the AC source.

While the invention has been shown and described in terms of a preferred embodiment it will be clear that this invention is not limited to this particular embodiment and that many changes and modifications may be made without departing from the true spirit and scope of the invention as defined in the appended claims.

What is claimed is:

1. Apparatus for detecting an abnormal condition of an AC source comprising a rectifier to rectify the voltage of said AC source; a first Schmitt trigger circuit to produce a pulse at a first level of the rectified voltage; a second Schmitt trigger circuit to produce a pulse at a second level of said rectified voltage; said second level being lower than said first level; a first monostable circuit responsive to the end of the output pulse from said second Schmitt trigger circuit for producing a pulse of a constant width which is longer than the spacing between output pulses from said second Schmitt trigger circuit when the frequency of said source voltage is normal; a bistable circuit which is set at the beginning of the output pulse from said first Schmitt trigger circuit and reset at the end of the output pulse from said first monostable circuit; a second monostable circuit responsive to the beginning of the output pulse from said second Schmitt trigger circuit for producing a pulse of a constant width which is longer than the spacing between output pulses from said bistable circuit when the frequency of said source voltage is normal; and a gate circuit responsive to the output pulse from said bistable circuit and the output pulse from said second monostable circuit for producing an abnormal signal in the absence of said two output pulses supplied to said gate circuit.

2. The apparatus according to claim 1 wherein the output pulse from said second monostable circuit disappears when the output pulse from said second Schmitt trigger circuit disappears.

3. The apparatus according to claim 1 which further comprises a third Schmitt trigger circuit responsive to a third level of said rectified voltage which is higher than said first level, the output pulse of said third Schmitt trigger circuit being utilized to reset said bistable circuit at the beginning thereof.